United States Patent
Yamaguchi (10) Patent No.: US 8,956,430 B2
(45) Date of Patent: Feb. 17, 2015

(54) POLISHING COMPOSITION

(75) Inventor: Norihito Yamaguchi, Wakayama (JP)

(73) Assignee: Kao Corporation, Tokyo (JP)

(*) Notice: Subject to any disclaimer, the term of this patent is extended or adjusted under 35 U.S.C. 154(b) by 0 days.

(21) Appl. No.: 12/285,329

(22) Filed: Oct. 2, 2008

(65) Prior Publication Data
US 2009/0042485 A1 Feb. 12, 2009

Related U.S. Application Data

(62) Division of application No. 11/510,707, filed on Aug. 28, 2006, now abandoned.

(30) Foreign Application Priority Data

Aug. 30, 2005 (JP) .................................. 2005-249877
Nov. 11, 2005 (JP) .................................. 2005-327169

(51) Int. Cl.
| | |
|---|---|
| *B24D 3/02* | (2006.01) |
| *C09C 1/68* | (2006.01) |
| *C09K 3/14* | (2006.01) |
| *B24B 1/00* | (2006.01) |
| *B24C 1/00* | (2006.01) |
| *C09G 1/02* | (2006.01) |

(52) U.S. Cl.
CPC ........................................ *C09G 1/02* (2013.01)
USPC .................... 51/308; 51/309; 51/307; 451/36

(58) Field of Classification Search
USPC ...................... 451/36; 51/307–309
See application file for complete search history.

(56) References Cited

U.S. PATENT DOCUMENTS

| | | | |
|---|---|---|---|
| 6,309,434 B1 | 10/2001 | Ohashi | |
| 6,328,774 B1 | 12/2001 | Shemo et al. | |
| 6,336,945 B1 | 1/2002 | Yamamoto et al. | |
| 6,814,767 B2* | 11/2004 | Hirano | ............................ 51/308 |
| 7,485,162 B2 | 2/2009 | Matsuda et al. | |
| 2001/0036795 A1 | 11/2001 | Merchant et al. | |
| 2001/0036796 A1 | 11/2001 | Misra et al. | |

(Continued)

FOREIGN PATENT DOCUMENTS

| | | |
|---|---|---|
| EP | 1036836 A1 | 9/2000 |
| EP | 154165 A1 | 6/2005 |

(Continued)

OTHER PUBLICATIONS

An Office Action from Japanese Patent Appl. No. 2005-249877, mailed Jul. 14, 2009.

(Continued)

*Primary Examiner* — Shuangyi Abu Ali
(74) *Attorney, Agent, or Firm* — Birch, Stewart, Kolasch & Birch, LLP (57) ABSTRACT

A polishing composition containing a silica, an acid, a surfactant, and water, wherein (a) the acid has solubility in water at 25° C. of 1 g or more per 100 g of an aqueous saturated solution; (b) the surfactant is a sulfonic acid represented by the formula (1) or (2), or a salt thereof; and (c) the polishing composition has a pH of a specified range; and a polishing process of a substrate using the polishing composition are provided. The polishing composition is suitably used, for example in polishing a substrate for disk recording media such as magnetic disks, optical disks and opto-magnetic disks.

2 Claims, 1 Drawing Sheet

(56) References Cited

U.S. PATENT DOCUMENTS

| | | |
|---|---|---|
| 2002/0023389 A1 | 2/2002 | Minamihaba et al. |
| 2003/0162399 A1 | 8/2003 | Singh |
| 2004/0006924 A1 | 1/2004 | Scott et al. |
| 2004/0127147 A1* | 7/2004 | Suenaga et al. ............... 451/36 |
| 2004/0134376 A1 | 7/2004 | Hirano |
| 2004/0144755 A1 | 7/2004 | Motonari et al. |
| 2004/0147118 A1 | 7/2004 | Liu et al. |
| 2004/0148867 A1* | 8/2004 | Matsumi ..................... 51/298 |
| 2004/0162011 A1 | 8/2004 | Konno et al. |
| 2004/0261323 A1 | 12/2004 | Minamihaba et al. |
| 2005/0005525 A1* | 1/2005 | Li et al. ...................... 51/298 |
| 2005/0208883 A1 | 9/2005 | Yoshida et al. |
| 2006/0046490 A1 | 3/2006 | Banerjee et al. |
| 2007/0167116 A1 | 7/2007 | Yoshida et al. |
| 2007/0176140 A1 | 8/2007 | Matsuda et al. |
| 2008/0105651 A1 | 5/2008 | Mabuchi et al. |

FOREIGN PATENT DOCUMENTS

| | | |
|---|---|---|
| GB | 2421955 A | 7/2006 |
| JP | 05-112775 A | 5/1993 |
| JP | 2001-98254 A | 4/2001 |
| JP | 2001-288456 A | 10/2001 |
| JP | 2004-123921 A | 4/2004 |
| JP | 2004-179294 A | 6/2004 |
| JP | 2005-116987 A | 4/2005 |
| JP | 2005-123482 A | 5/2005 |
| JP | 2005-167231 A | 6/2005 |
| JP | 2005-262413 A | 9/2005 |
| JP | 2007-53214 A | 3/2007 |
| WO | WO-98/21289 A1 | 5/1998 |
| WO | WO-2006/030595 A1 | 3/2006 |

OTHER PUBLICATIONS

Combined Search Report and Examination Report under Section 17 and 18(3) for Application No. GB1001071.8 issued by United Kingdom Patent Office on Mar. 1, 2010.

Chinese Application No. 200610108436.8; Chinese Office Action, Nov. 23, 2010, 4 pages.

JP 2005-327169, Japanese Office Action, Jul. 29, 2010, 3 pages.

Chinese Office Action for Application No. 200610108436.8 dated Feb. 23, 2012 (with English translation).

Taiwanese Office Action, dated Sep. 2, 2014, for Taiwanese Application No. 101138165.

* cited by examiner

POLISHING COMPOSITION

CROSS-REFERENCE

This application is a Divisional of application Ser. No. 11/510,707 filed on Aug. 28, 2006 now abandoned, which claims priority on Japanese Application Nos. JP-2005-249877 filed on Aug. 30, 2005 and JP-2005-327169 filed on Nov. 11, 2005. The entire contents of each of these applications are hereby incorporated by reference.

FIELD OF THE INVENTION

The present invention relates to a polishing composition, a polishing process for a substrate, and a method for manufacturing a substrate.

BACKGROUND OF THE INVENTION

Recently, miniaturization of memory hard disk drives and high storage memory capacity for memory hard disk drives have been demanded. In order to increase the recording density, it has been urged to lower the flying height of a magnetic head and to reduce the unit recording area. In addition, even for the manufacturing step of a magnetic disk substrate, the necessary requirements of the surface qualities of the substrate after polishing have become more severe every year. In order to satisfy the lowering of the flying height of the magnetic head, surface roughness, microwaviness, and projections have been required to be reduced. In addition, in order to increase the recording area per single hard disk, planarization has been required even to an edge portion of the circumference of the substrate, so that it has been important to suppress roll-off (edge-rounding) during polishing of a substrate.

WO 98/21289 discloses a polishing composition containing an oxyalkylene alkyl sulfate, but the reduction in roll-off cannot be said to be sufficient. JP2004-179294 A discloses a polishing composition containing an aromatic sulfonic acid or a salt thereof for a technique of polishing a semiconductor, but the reduction in roll-off is insufficient due to the combination with a weak acid. Similarly, JP2005-167231 A discloses a polishing composition containing an alkylaromatic sulfonic acid or a salt thereof for a technique of polishing a semiconductor, but the reduction in roll-off cannot be accomplished because the polishing composition is weakly acidic or basic.

SUMMARY OF THE INVENTION

The present invention relates to:
[1] a polishing composition containing a silica, an acid, a surfactant, and water, wherein:
(a) the acid has solubility in water at 25° C. of 1 g or more per 100 g of an aqueous saturated solution;
(b) the surfactant is a sulfonic acid represented by the following formula (1):

$$R-(O)_n-X-SO_3H \tag{1}$$

wherein R is a hydrocarbon group having 3 to 20 carbon atoms, wherein a part or all of the hydrogen atoms may be substituted with fluorine atoms; X is a residue resulting from removing two hydrogen atoms from an aromatic ring of an aromatic hydrocarbon; and n is 0 or 1;
or a salt thereof; and
(c) the polishing composition has a pH of from 0 to 4;

[2] a polishing composition containing a silica, an acid, a surfactant, and water, wherein:
(a') the acid has solubility in water at 25° C. of 1 g or more per 100 g of an aqueous saturated solution;
(b') the surfactant is a sulfonic acid represented by the following formula (2):

$$R'-O-(AO)_n-SO_3H \tag{2}$$

wherein R' is a hydrocarbon group having 3 to 20 carbon atoms; AO is an oxyalkylene group having 2 to 4 carbon atoms; and n, which is an average number of moles of alkylene oxide added, is from 1 to 6;
or a salt thereof; and
(c') the polishing composition has a pH of from 0 to 3;
[3] a polishing process of a substrate, including the steps of feeding the polishing composition as defined in the above [1] or [2] at a flow rate of 0.05 mL/minute or more per 1 cm² of a substrate to be polished, and polishing the substrate at a polishing pressure of from 5 to 50 kPa;
[4] a method for manufacturing a substrate, including the steps of feeding the polishing composition as defined in the above [1] or [2] at a flow rate of 0.05 mL/minute or more per 1 cm² of a substrate to be polished, and polishing the substrate at a polishing pressure of from 5 to 50 kPa; and
[5] a method of reducing roll-off of a substrate, including the step of polishing a substrate with the polishing composition as defined in the above [1] or [2].

BRIEF DESCRIPTION OF THE DRAWINGS

FIG. 1 is a cross-sectional view of a substrate showing the determination positions during the determination of roll-off.
The references in FIG. 1 are as follows.
A is a point 43.0 mm away from the center of the disk towards the circumference; B is a point 44.0 mm away from the center of the disk towards the circumference; C is a point 46.6 mm away from the center of the disk towards the circumference; C' is an intersection point between a straight line passing through the points A, B, and C and a straight line drawn perpendicular to the straight line at the point C on a disk surface; and X is roll-off.

DETAILED DESCRIPTION OF THE INVENTION

The present invention relates to a polishing composition which is effective in reduction of roll-off at an edge portion of the circumference of a substrate, especially effective in reduction of roll-off necessary for high storage capacity of a hard disk, a polishing process of a substrate for reducing roll-off, and a method for manufacturing a substrate, using the polishing composition.

Since the edge rounding of the edge portion of the circumference of the substrate, i.e. roll-off, can be remarkably reduced by using the polishing composition of the present invention in, for example, a polishing step in the step of manufacturing a hard disk substrate, an effect such as a substrate suitable for a hard disk having a high storage capacity can be manufactured is exhibited.

These and other advantages of the present invention will be apparent from the following description.

One of the features of the polishing composition of the present invention resides in that the polishing composition contains an abrasive containing a silica, a surfactant containing a sulfonic acid having a specified structure or a salt thereof, and an acid having a specified solubility to water, and has a specified pH.

The silica usable in the present invention includes, for example, colloidal silica, fumed silica, surface-modified silica and the like. Among them, the colloidal silica is preferable from the viewpoint of obtaining an even higher level of planarization of the surface of the substrate to be polished. The colloidal silica may be those that are commercially available, or those that are obtained by a process, for example, of forming colloidal silica from an aqueous silicic acid solution according to a known preparation process, or the like. The used form of the silica is preferably in the form of a slurry from the viewpoint of operability.

The silica has an average particle size of primary particles, regardless of whether or not the silica is used alone or in admixture of two or more kinds, of preferably 1 nm or more, more preferably 3 nm or more, and even more preferably 5 nm or more, from the viewpoint of increasing the polishing rate, and the silica has an average particle size of primary particles of preferably 40 nm or less, more preferably 35 nm or less, even more preferably 30 nm or less, even more preferably 25 nm or less, and even more preferably 20 nm or less, from the viewpoint of reducing surface roughness (average surface roughness: Ra, a peak-to-valley value: Rmax). Therefore, the primary particles have an average particle size of preferably from 1 to 40 nm, more preferably from 1 to 35 nm, even more preferably from 3 to 30 nm, even more preferably from 5 to 25 nm, and even more preferably from 5 to 20 nm. Further, when the primary particles are aggregated to form secondary particles, the average particle size of the secondary particles is preferably from 5 to 150 nm, more preferably from 5 to 100 nm, even more preferably from 5 to 80 nm, even more preferably from 5 to 50 nm, and even more preferably from 5 to 30 nm, from the viewpoint of increasing the polishing rate, and from the viewpoint of reducing surface roughness of the substrate in the same manner as above.

In addition, the average particle size of the primary particles of the silica is obtained by using an image observed with a transmission electron microscope and determining a particle size at 50% counted from a smaller particle size side of the primary particles (D50), and the resulting value is defined as the average particle size of the primary particles. In addition, the average particle size of the secondary particles can be determined as a volume-average particle size using a laser light scattering method.

The particle size distribution of the silica is such that D90/D50 is preferably from 1 to 3, and more preferably from 1.3 to 3, from the viewpoint of accomplishing reduction of nano scratches, reduction of surface roughness, and a high polishing rate. Here, D90 refers to a particle size obtained by using an image observed with a transmission electron microscope and determining a particle size at 90% counted from a smaller particle size side of the primary particles.

The content of the silica is preferably 0.5% by weight or more, more preferably 1% by weight or more, even more preferably 3% by weight or more, and even more preferably 5% by weight or more, of the polishing composition, from the viewpoint of increasing the polishing rate, and the content of the silica is preferably 20% by weight or less, more preferably 15% by weight or less, even more preferably 13% by weight or less, and even more preferably 10% by weight or less, of the polishing composition, from the viewpoint of improving surface properties. In other words, the content is preferably from 0.5 to 20% by weight, more preferably from 1 to 15% by weight, even more preferably from 3 to 13% by weight, and even more preferably from 5 to 10% by weight.

The acid usable in the present invention is an acid having a solubility in water at 25° C. of 1 g or more per 100 g of the aqueous saturated solution. The solubility of the acid in the present invention is expressed by mass (g) of an acid contained in 100 g of the aqueous saturated solution of the acid at 25° C. The solubility of the acid is listed in *Revised Fourth Edition, Kagaku Binran (Kiso-hen)* (*Chemistry Handbook (Fundamentals)*) *II*, 156-178 (Edited by Nihon Kagakukai) and the like.

As the above-mentioned acid, it is desired that those acids have a solubility of preferably 2 g or more, more preferably 3 g or more, even more preferably 4 g or more, even more preferably 5 g or more, and even more preferably 6 g or more, from the viewpoint of increasing the polishing rate and reducing roll-off. The acid includes, for example, inorganic acids such as sulfuric acid, sulfurous acid, persulfuric acid, nitric acid, hydrochloric acid, pyrophosphoric acid, phosphonic acid, phosphoric acid, and amide sulfuric acid; organic phosphonic acids such as 2-aminoethylphosphonic acid, 1-hydroxyethylidene-1,1-diphosphonic acid (HEDP), aminotri (methylenephosphonic acid), ethylenediaminetetra (methylenephosphonic acid), diethylenetriaminepenta (methylenephosphonic acid), ethane-1,1-diphosphonic acid, ethane-1,1,1-triphosphonic acid, methanehydroxyphosphonic acid, 2-phosphonobutane-1,2-dicarboxylic acid, 1-phosphonobutane-2,3,4-tricarboxylic acid, and α-methylphosphonosuccinic acid; aminocarboxylic acids such as glutamic acid and picolinic acid; carboxylic acids such as oxalic acid, nitroacetic acid, maleic acid, and oxaloacetic acid. Among them, the inorganic acids and the organic phosphonic acids, which have a high solubility in water, are preferable, from the viewpoint of reducing scratches and roll-off. Also, among the inorganic acids, sulfuric acid, nitric acid, hydrochloric acid, and perchloric acid are more preferable. Among the organic phosphonic acids, HEDP, aminotri(methylenephosphonic acid), and diethylenetriaminepenta(methylenephosphonic acid) are more preferable. These acids may be used alone or in admixture of two or more kinds.

It is undesired to use an aromatic carboxylic acid as an acid because its solubility is low at a pH of from 0 to 4, and the reduction of roll-off is not found when the acid is dissolved.

In addition, these acids usable in the present invention may be in the form of partly neutralized salts. Preferred examples of the salt include sodium citrate, sodium sulfate, sodium nitrate, and the like.

The content of the acid is preferably 0.1% by weight or more, more preferably 0.2% by weight or more, and even more preferably 0.4% by weight or more, of the polishing composition, from the viewpoint of reducing roll-off and increasing the polishing rate. In addition, the content of the acid is preferably 2% by weight or less, more preferably 1.5% by weight or less, and even more preferably 1% by weight or less, from the viewpoint of influence to the human body and corrosion of the polishing apparatus. Therefore, the content of the acid is preferably from 0.1 to 2% by weight, more preferably from 0.2 to 1.5% by weight, and even more preferably from 0.4 to 1% by weight, of the polishing composition, from the viewpoint of reduction of roll-off and operating environment.

In the present invention, among the acids, those showing a standard electrode voltage of their aqueous solution (25° C.) of 1 V or more are handled as an oxidizing agent. The standard electrode voltage of the aqueous solution is listed in, for example, *Revised Fourth Edition, Kagaku Binran (Kiso-hen)* (*Chemistry Handbook (Fundamentals)*) *II*, 464-468 (Edited by Nihon Kagakukai) and the like. In addition, the standard electrode voltage of an acid refers to a voltage in a negative ion of an acid.

As the acid usable in the present invention, those further having a pKa of 4 or less are preferable, from the viewpoint of reducing roll-off. Among them, it is desired that those acids have a pKa of preferably 3 or less, more preferably 2 or less, even more preferably 1.5 or less, and even more preferably 1 or less.

The acid that falls under the sulfonic acid as the surfactant usable in the present invention is considered not be included in the "acid" usable in the polishing composition of the present invention.

The surfactant usable in the polishing composition of the present invention, in one embodiment (Embodiment A) of the present invention, is a sulfonic acid represented by the following formula (1):

R—(O)$_n$—X—SO$_3$H          (1)

wherein R is a hydrocarbon group having 3 to 20 carbon atoms, wherein a part or all of the hydrogen atoms may be substituted with fluorine atoms; X is a residue resulting from removing two hydrogen atoms from an aromatic ring of an aromatic hydrocarbon; and n is 0 or 1, or a salt thereof.

R may be a saturated hydrocarbon group or an unsaturated hydrocarbon group, which may be linear or branched. Further, a part or all of the hydrogen atoms in R may be substituted with fluorine atoms, or a part of the hydrogen atoms of the hydrocarbon group may be substituted with a substituent other than fluorine atoms within the range that exhibits the effects of the present invention. R is preferably a hydrocarbon group having 6 to 20 carbon atoms, and R is more preferably an alkyl group having 6 to 20 carbon atoms (including those hydrocarbon groups substituted with a substituent other than the above-mentioned fluorine atoms, hereinafter the same), or a perfluorinated hydrocarbon group having 6 to 20 carbon atoms, from the viewpoint of reducing roll-off. The hydrocarbon group is even more preferably an alkyl group having 6 to 18 carbon atoms or a perfluorinated hydrocarbon group having 6 to 18 carbon atoms, from the viewpoint of operability such as foaming resistance.

X is a residue resulting from removing two hydrogen atoms from an aromatic ring of an aromatic hydrocarbon such as benzene or naphthalene, and the hydrogen atom bonded to the aromatic ring may be a residue resulting from substitution with other atom or an atomic group. X is preferably a phenylene group (including the substituted phenylene group), from the viewpoint of reducing roll-off.

The surfactant usable in the formula (1) in the present invention may or may not have an ether bond between R and X. When R is an alkyl group, n is preferably equal to 0 (i.e., n=0), and when R is a perfluorinated hydrocarbon group, n is preferably equal to 1 (i.e., n=1). In addition, these surfactants can be used in admixture.

The counterion for the sulfonate usable in the polishing composition of the present invention includes, for example, inorganic cations such as alkali metal ions, alkaline earth metal ions, and ammonium ions; and organic cations such as primary to quaternary ammonium ions. Among them, the alkali metal ions are preferable, from the viewpoint of solubility of the sulfonate in water.

Further, the surfactant usable in this embodiment includes those surfactants having an alkyl group, such as sodium dodecylbenzenesulfonate and sodium dodecylnaphthalylsulfonate; those surfactants having a perfluorinated hydrocarbon group such as sodium 4-(perfluoro-2-methyl-2-pentene-3-ether)benzenesulfonate; and the like. For example, one commercially available from Kao Corporation under the trade name of NEOPELEX or PELEX, one commercially available from TOHO Chemical Industry Co., LTD. under the trade name of LUNOX, one commercially available from Tayca Corporation under the trade name of TAYCAPOWER, one commercially available from Nippon Nyukazai Co., Ltd. under the trade name of NEWCOL, one commercially available from NEOS COMPANY LIMITED under the trade name of FTERGENT, and the like can be used.

Further, in another embodiment of the present invention (Embodiment B), as the surfactant a sulfonic acid represented by the following formula (2):

R'—O-(AO)$_n$—SO$_3$H          (2)

wherein R' is a hydrocarbon group having 3 to 20 carbon atoms; AO is an oxyalkylene group having 2 to 4 carbon atoms; and n, which is an average number of moles of alkylene oxide added, is from 1 to 6, or a salt thereof is used.

R' may be a saturated hydrocarbon group or an unsaturated hydrocarbon group, which may be linear or branched. In addition, R' may be an aliphatic hydrocarbon group or aromatic hydrocarbon group. Further, in R', a part of hydrogen atoms of the hydrocarbon group may be substituted with other atoms or a substituent within the scope that exhibits the effects of the present invention. R' is preferably a hydrocarbon group having 6 to 20 carbon atoms, and R' is more preferably an alkyl group having 6 to 20 carbon atoms (including substituted hydrocarbons, hereinafter referred to the same), from the viewpoint of reducing roll-off. Even more, an alkyl group having 6 to 18 carbon atoms is more preferable, from the viewpoint of operability such as foaming resistance.

AO is an oxyalkylene group having 2 to 4 carbon atoms. These oxyalkylene groups include oxyethylene group, oxypropylene group, oxytrimethylene group, oxybutylene group, and the like. These oxyalkylene groups may be used alone or in admixture thereof.

The number n of moles of the oxyalkylene group added in the sulfonic acid is from 1 to 6. The number n of moles of the oxyalkylene group added in the sulfonic acid is preferably from 1 to 4, and more preferably from 1 to 3, from the viewpoint of controlling adsorption of the sulfonic acid to the silica surface and enhancing dispersion stability of the silica.

The counterion of the sulfonate usable in the polishing composition of the present invention includes, for example, inorganic cations such as alkali metal ions, alkaline earth metal ions, and ammonium ions; and organic cations such as primary to quaternary ammonium ions. Among them, the alkali metal ions are preferable, from the viewpoint of solubility of the sulfonate in water.

The surfactant preferably usable in this Embodiment includes sodium polyoxyethylene (2 moles added) lauryl ether sulfate, sodium polyoxyethylene (4 moles added) lauryl ether sulfate, and the like.

By using the surfactant as mentioned above together with an acid having a high solubility in water, the pH of the polishing composition is adjusted to from 0 to 4 in Embodiment A, and the pH is adjusted to from 0 to 3 in Embodiment B, whereby exhibiting the effects of the present invention. For example, by using a sodium alkylbenzenesulfonate or sodium polyoxyethylene lauryl sulfate together with sulfuric acid of which solubility in water (25° C.) is 80.3 g/100 g of the aqueous saturated solution, roll-off can be remarkably reduced. The surfactants in the polishing composition may be used alone or in admixture of two or more kinds.

It is desired that the content of the surfactant represented by the formula (1) or (2) is preferably from 0.005 to 2% by weight, more preferably from 0.01 to 2% by weight, even more preferably from 0.025 to 2% by weight, and even more preferably from 0.05 to 2% by weight, of the polishing composition, from the viewpoint of reducing roll-off. Even more, the content of the surfactant is even more preferably from 0.05 to 0.5% by weight in consideration of operability such as foaming resistance.

In addition, according to the present invention, a polishing composition capable of not only reducing roll-off but also waviness of the substrate surface, especially waviness of the peripheral portion, and a polishing process of a substrate with the polishing composition are provided. The polishing composition is a polishing composition for a substrate for a magnetic disk, which contains a silica and a surfactant, and has a pH of from 0 to 2.5, and the feature of the polishing composition resides in that the surfactant is one or more compounds selected from the group consisting of the sulfonic acid compounds represented by the formulas (3) and (4).

Since the magnetic head flies and moves over the entire surface of the magnetic disk substrate, it is also earnestly desired to reduce waviness over the entire surface of the substrate. However, since a profilometer or an optical measuring equipment has been so far used, only the fine portions of waviness (for example, profilometer diameter: 0.2 μm, cut-off size: 800 μm) can be evaluated. Therefore, an extensively long period of time is necessary for the determination of waviness of the entire surface of the substrate, and the determination is essentially difficult. Therefore, the evaluation of waviness over the entire surface of the substrate has not yet been accomplished.

Presently, the present inventors have found as a result of the evaluation of waviness over the entire surface of the substrate using an equipment (commercially available from ThôT Technologies, Model M4224), that is capable of evaluating the entire surface of the magnetic disk substrate for the first time that the size of waviness greatly differs within the surface of the substrate. Especially, it can be seen that waviness at the peripheral portion (for example, a position at a radius of 46 mm away from the center of the substrate) is remarkably large as compared to the internal portion (for example, a position at a radius of 20 mm away from the center of the substrate). Therefore, it is considered that reduction in waviness at the peripheral portion would reduce waviness over the entire surface of the substrate, and whereby consequently the flying height of the magnetic head can be further reduced.

The sulfonic acid compound represented by the formula (3) refers to a sulfonic acid represented by the following formula:

$$R^1\text{—}(O)m^1\text{—}SO_3M^1 \quad (3)$$

wherein R' is a hydrocarbon group having 3 to 20 carbon atoms, $M^1$ is a hydrogen atom, an inorganic cation, or an organic cation, and $m^1$ is 0 or 1, or a salt thereof.

R' may be a saturated hydrocarbon group or an unsaturated hydrocarbon group, which may be linear or branched. It is desired that R' is a hydrocarbon group having 6 to 20 carbon atoms, and that R' is preferably an alkyl group having 6 to 20 carbon atoms, more preferably an alkyl group having 8 to 16 carbon atoms, and even more preferably an alkyl group having 8 to 14 carbon atoms, from the viewpoint of reducing roll-off and waviness on the peripheral portion. In addition, the inorganic cation of $M^1$ includes alkali metal ions, alkaline earth metal ions, ammonium ions and the like. Among them, the alkali metal ions and the ammonium ions are preferable, and more preferably the alkali metal ions, from the viewpoint of reducing roll-off and waviness on the peripheral portion. The organic cation of $M^1$ includes primary to quaternary ammonium ions, various kinds of amines, and the like. Among them, the amine salt is preferable, and triethanolamine is more preferable.

Specific examples of the surfactant represented by the formula (3) includes sodium octylsulfonate, sodium alkane (C14-16)sulfonate, sodium lauryl sulfate, ammonium lauryl sulfate, triethanolamine salt of lauryl sulfuric acid, sodium salt of sulfuric acid of a higher alcohol, and the like.

The sulfonic acid compound represented by the formula (4) refers to a sulfonic acid represented by the following formula (4):

$$R^2OOC\text{—}CH_2\text{—}CH(SO_3M^2)\text{—}COOR^3 \quad (4)$$

wherein each of $R^2$ and $R^3$ is independently a hydrocarbon group having 3 to 20 carbon atoms, $M^2$ is a hydrogen atom, an inorganic cation, or an organic cation, or a salt thereof.

Each of $R^2$ and $R^3$ may be independently a saturated hydrocarbon group or an unsaturated hydrocarbon group, which may be linear or branched. From the viewpoint of reducing roll-off and waviness, each of the preferred $R^2$ and $R^3$ may be independently the same one as those exemplified for the $R^1$ mentioned above. Each of the preferred inorganic cation and organic cation of $M^2$ may be the same one as those exemplified for the $R^1$ mentioned above.

Specific examples of the surfactant represented by the formula (4) include sodium dioctyl sulfosuccinate, sodium ditridecyl sulfosuccinate, sodium dicyclohexyl sulfosuccinate, and the like.

When the surfactant represented by the formula (3) or (4) is further used, it is desired that the content of these surfactants is preferably from 0.005 to 1% by weight, more preferably from 0.01 to 1% by weight, and even more preferably from 0.02 to 1% by weight, of the polishing composition, from the viewpoint of reducing roll-off and waviness on the peripheral portion. Even more, the content of the surfactant is preferably from 0.02 to 0.5% by weight, and more preferably from 0.02 to 0.2% by weight, in consideration of operability such as foaming resistance.

Water usable in the polishing composition of the present invention includes distilled water, ion-exchanged water, ultrapure water, and the like. The ion-exchanged water and ultrapure water are preferable, and ultrapure water is more preferable, from the viewpoint of the surface cleaning property of a substrate to be polished. The content of water is preferably from 60 to 99% by weight, and more preferably from 70 to 98% by weight, of the polishing composition. In addition, an organic solvent such as an alcohol may be contained within the range so as not to hinder the effects of the present invention.

The polishing composition of the present invention has a pH of from 0 to 4 in Embodiment A, and a pH of from 0 to 3 in Embodiment B. The pH can be also adjusted with the sulfonic acid represented by the formula (1) or (2) or a salt thereof, and it is preferable that the pH is adjusted with an acid having a solubility in water at 25° C. of 1 g or more per 100 g of an aqueous saturated solution, from the viewpoint of reducing roll-off. The pH in Embodiment A is preferably 3 or less, more preferably 2.5 or less, and even more preferably 2 or less, from the viewpoint of reducing roll-off and increasing the polishing rate, and the pH is preferably 0.1 or more, more preferably 0.5 or more, and even more preferably 0.8 or more, from the viewpoint of corrosion of the polishing machine. Therefore, the pH is preferably from 0.1 to 3, more preferably from 0.5 to 2.5, and even more preferably from 0.8 to 2, from the viewpoint of reduction of roll-off and working environment. In addition, in Embodiment B, the pH is preferably 2.8 or less, more preferably 2.5 or less, and even more preferably 2 or less, from the viewpoint of reducing roll-off and increasing polishing rate. In addition, the pH is preferably 0.1 or more, more preferably 0.5 or more, and even more preferably 0.8 or more, from the viewpoint of corrosion of the polishing machine. Therefore, the pH is preferably from 0.1 to 2.8, more preferably from 0.5 to 2.5, and even more preferably from 0.8 to 2, from the viewpoint of reduction of roll-off and working environment.

The polishing composition of the present invention further contains an oxidizing agent, whereby its polishing rate can be increased without worsening roll-off. As the oxidizing agent, a peroxide, a salt of permanganic acid, a salt of chromic acid, a salt of nitric acid, peroxo acid or a salt thereof, oxyacid or a salt thereof, a metal salt or the like can be used.

The peroxide includes hydrogen peroxide, sodium peroxide, barium peroxide, and the like; the salt of permanganic acid includes potassium permanganate, and the like; the salt of chromic acid includes metal salts of chromic acid, metal salts of dichromic acid, and the like; the salt of nitric acid includes iron (III) nitrate and ammonium nitrate; the peroxo acid or a salt thereof include peroxodisulfuric acid, ammonium peroxodisulfate, metal salts of peroxodisulfuric acid, peroxophosphoric acid, peroxosulfuric acid, sodium peroxoborate, performic acid, peracetic acid, perbenzoic acid, perphthalic acid, and the like; oxyacid or salts thereof include hypochlorous acid, hypobromous acid, hypoiodous acid, chloric acid, bromic acid, iodic acid, sodium hypochlorate, calcium hypochlorate, and the like; metal salts include iron (III) chloride, iron (III) sulfate, iron (III) citrate, ammonium iron (III) sulfate, and the like. The preferred oxidizing agent includes hydrogen peroxide, iron (III) nitrate, peracetic acid, ammonium peroxodisulfate, iron (III) sulfate, ammonium iron (III) sulfate and the like. These oxidizing agents can be used alone or in admixture of two or more kinds. It is preferable to use hydrogen peroxide, from the viewpoint that ions derived from the oxidizing agent are less likely to adhere to the surface of the object to be polished.

The content of the oxidizing agent is preferably 0.002% by weight or more, more preferably 0.005% by weight or more, even more preferably 0.007% by weight or more, and even more preferably 0.01% by weight or more, of the polishing composition, from the viewpoint of increasing the polishing rate, and the content of the oxidizing agent is preferably 20% by weight or less, more preferably 15% by weight or less, even more preferably 10% by weight or less, and even more preferably 5% by weight or less, of the polishing composition, from the viewpoint of reducing surface roughness and waviness, and reducing surface defects such as pits and scratches, thereby improving the surface quality. Therefore, the content of the oxidizing agent is preferably from 0.002 to 20% by weight, more preferably from 0.005 to 15% by weight, even more preferably from 0.007 to 10% by weight, and even more preferably from 0.01 to 5% by weight, of the polishing composition, in order to increase the polishing rate while maintaining the surface quality.

The polishing composition of the present invention may contain a radical scavenger, an anticorrosive, a defoaming agent, an antibacterial agent or the like as occasion demands. The content of these other optional components is preferably from 0 to 10% by weight, and more preferably from 0 to 5% by weight, of the polishing composition.

The polishing composition of the present invention can be prepared, for example, as follows. Specifically, an aqueous surfactant solution is prepared, and an acid having a solubility in water at 25° C. of 1 g or more per 100 g of its aqueous saturated solution and further a silica slurry are added to the aqueous surfactant solution, to give a polishing composition. Optional components are further blended thereto as occasion demands, and the polishing composition is fed to a polishing machine. The surfactant and the optional components may be previously added while mixing before feeding to the polishing machine, or may be added while mixing during the process of feeding the components to the polishing machine (for instance, into a feed pipe or on a polishing substrate). The silica may be mixed in a state of a concentrated slurry when the polishing composition is prepared, or may be mixed after diluting the concentrated slurry with water or the like. Further, the silica may be added while mixing during the process of feeding the components to the polishing machine in the same manner as above.

When the polishing composition of the present invention is prepared, it is preferable that the aqueous solution of an acid is previously prepared, and thereafter a silica slurry is added thereto while mixing, from the viewpoint of the stability of silica. In addition, it is preferable that other optional components may be previously dissolved in water to give an aqueous solution, and thereafter the aqueous solution is mixed with the silica slurry. Further, when the silica slurry is mixed, it is preferable to mix at a rate that does not dry the silica particles, from the viewpoint of preventing aggregation caused by drying of the silica particles. When the silica slurry is mixed, it is preferable that a silica slurry is added to and mixed with an aqueous solution of components other than silica while stirring, from the viewpoint of dispersibility of the silica.

The present invention also relates to a polishing process of a substrate and a method for manufacturing a substrate. By polishing a substrate to be polished with the polishing composition of the present invention that is obtained in the manner as described above, a substrate having controlled roll-off can be manufactured. Specifically, roll-off can be effectively controlled by pressing a substrate against platens to which a nonwoven fabric, organic polymer polishing pad is attached, feeding the polishing composition of the present invention to a substrate at a flow rate of 0.05 mL/minute or more per 1 $cm^2$ of a substrate to be polished, and polishing the substrate while moving the polishing platens or the substrate at a polishing pressure of from 5 to 50 kPa.

In the polishing process of a substrate and the method for manufacturing a substrate of the present invention, the polishing pressure refers to a pressure of a platen applied to a polishing side of a substrate to be polished during polishing. In case of setting the polishing pressure at 5 kPa or more, it is deduced that roll-off can be effectively reduced because the substrate to be polished is pressed down against the platens, the substrate to be polished is less likely to be vibrated, and a load is less likely to be applied to the edge portion of the circumference of the substrate. The polishing pressure is preferably 7 kPa or more, and more preferably 10 kPa or more, in consideration of productivity. On the other hand, when the polishing pressure becomes high, scratches are likely to be generated, so that the platen pressure is 50 kPa or less, preferably 30 kPa or less, and more preferably 20 kPa or less. Therefore, in the polishing process of a substrate and the method for manufacturing a substrate of the present invention, the polishing pressure is from 5 to 50 kPa, preferably from 7 to 30 kPa, and more preferably from 10 to 20 kPa. The polishing pressure can be adjusted by applying an air pressure or a load to the platens and/or the substrate.

The flow rate of the polishing composition in the polishing process of a substrate and the method for manufacturing a substrate of the present invention is 0.05 mL/minute or more per 1 $cm^2$ of a substrate to be polished. When the flow rate is 0.05 mL/minute or more, it is deduced that roll-off can be effectively reduced because frictional resistance between the polishing pad and the substrate to be polished is controlled, the substrate to be polished is less likely to be vibrated, and a load is less likely to be applied to the edge portion of the circumference of the substrate. The flow rate is preferably 0.07 mL/minute or more, more preferably 0.09 mL/minute or more, even more preferably 0.12 mL/minute or more, and even more preferably 0.15 mL/minute or more, from the viewpoint of reducing roll-off due to increase in frictional resistance. In addition, the flow rate is preferably 0.50 mL/minute or less, more preferably 0.30 mL/minute or less, and even more preferably 0.25 mL/minute or less, per 1 cm$^2$ of a substrate to be polished, from the viewpoint of economically reducing roll-off. Therefore, the flow rate of the polishing composition is preferably from 0.07 to 0.50 mL/minute, more preferably from 0.09 to 0.50 mL/minute, even more preferably from 0.12 to 0.30 mL/minute, and even more preferably from 0.15 to 0.25 mL/minute, per 1 cm$^2$ of a substrate to be polished.

The method of feeding the polishing composition of the present invention to a substrate to be polished includes a method including the step of continuously feeding the polishing composition with, for example, a pump or the like. During the method, the polishing composition may be fed in a method of feeding a single liquid containing all the components, or alternatively, the components divided into two or more liquids in several kits in consideration of stability or the like of the polishing composition. In the case of the latter method, the above-mentioned several kits are mixed, for example, in a feed pipe or on a polishing substrate, to give a polishing composition of the present invention.

The polishing pad usable in the present invention is not particularly limited, and those polishing pads of suede type, nonwoven type, polyurethane-independent foaming type, and bi-layer type produced by laminating these can be used.

By lowering the relative rate of a substrate to be polished to a polishing pad in the polishing step, roll-off of the substrate and waviness in the peripheral portion can be even more improved. Here, the relative rate of the substrate to be polished to the polishing pad refers to one expressed by the following formula.

$$\text{Relative Rate}(m/s) = 2\pi\{(R_{up} - R_{down})/2\} \times \{D_{in}/2 + (D_{out} - D_{in})/4\}$$
$$= (\pi/4) \times (R_{up} - R_{down}) \times (D_{out} + D_{in})$$

wherein $R_{up}$ is a rotational speed (r/s) of an upper platen; and $R_{down}$ is a rotational speed (r/s) of a lower platen, wherein the value is indicated with a positive sign (+) when the lower platen rotates in the same direction as the upper platen, or with a negative sign (−) when the lower platen rotates in the opposite direction as the upper platen; and
$D_{out}$ is an outer diameter (m) of an upper or lower platen; and $D_{in}$ is an inner diameter (m) of an upper or lower platen.

The relative rate of the substrate to be polished to the polishing pad in the polishing step is preferably 1 m/s or less, more preferably 0.8 m/s or less, and even more preferably 0.6 m/s or less, from the viewpoint of reducing roll-off and waviness on the peripheral portion. In addition, the relative rate is preferably 0.1 μm/s or more, more preferably 0.2 m/s or more, even more preferably 0.3 m/s or more, and even more preferably 0.4 m/s or more, from the viewpoint of increasing productivity. In other words, the relative rate is preferably from 0.1 to 1 m/s, more preferably from 0.2 to 0.8 m/s, even more preferably from 0.3 to 0.6 m/s, and even more preferably from 0.4 to 0.6 m/s.

The polishing process is preferably employed in a second or subsequent polishing step of multi-polishing steps, and more preferably in a final (finish) polishing step. During the polishing process, in order to avoid admixture of the abrasive and the polishing composition of the previous step, separate polishing machines may be used for each of the steps, in which case it is preferable to clean the substrate for each polishing step. Here, the polishing machine is not particularly limited.

According to the above-mentioned polishing composition and the above-mentioned polishing process of the present invention, roll-off of the substrate can be reduced. Therefore, one embodiment of the present invention is to provide a method of reducing roll-off of a substrate of the present invention.

The surface properties of the substrate usable in the polishing process of a substrate and the method for manufacturing a substrate of the present invention are not particularly limited. In order to manufacture a substrate for high recording density, for example, a substrate having surface properties such as a surface roughness (Ra) of 1 nm or so is preferable. The surface roughness refers to a measure of surface smoothness, and its evaluation method is not limited. For example, surface roughness is evaluated as roughness detectable at a wavelength of 10 μm or less in an interatomic force microscope, and can be expressed as an average surface roughness Ra.

The material for the object to be polished such as a substrate to be polished suitably usable in the present invention includes, for example, metals or metalloids such as silicon, aluminum, nickel, tungsten, copper, tantalum and titanium and alloys which contain these metals; glassy substances such as glass, glassy carbon and amorphous carbons; ceramic materials such as alumina, silicon dioxide, silicon nitride, tantalum nitride, and titanium carbide; resins such as polyimide resins; and the like. Among them, it is preferable that an object to be polished is made of a metal such as aluminum, nickel, tungsten or copper, or made of an alloy containing these metals as the main components. For example, a substrate made of an aluminum alloy plated with Ni—P or a glass substrate made of crystallized glass, reinforced glass or the like is more preferable, and the substrate made of an aluminum alloy plated with Ni—P is even more preferable.

The shape for the object to be polished is not particularly limited. For example, those having shapes containing planar portions such as discs, plates, slabs and prisms, or shapes containing curved portions such as lenses can be subjects for polishing with the polishing composition of the present invention. Among them, those having the disc-shaped objects to be polished are even more preferable in polishing.

The polishing composition of the present invention is preferably used in polishing a substrate for precision parts. For example, the polishing composition is suitable for polishing substrates for disk recording media, such as magnetic disks such as optical disks, opto-magnetic disks, and photomask substrates, optical lenses, glass for liquid crystals, optical mirrors, optical prisms and semiconductor substrates, and the like. Since the polishing composition of the present invention, and the polishing process of a substrate and the method for manufacturing a substrate can remarkably reduce roll-off important for a high storage capacity, the polishing composition is even more preferable for polishing a substrate for hard disks and a method for manufacturing the substrate.

EXAMPLES

The following examples further describe and demonstrate embodiments of the present invention. The examples are given solely for the purposes of illustration and are not to be construed as limitations of the present invention.

Polishing was evaluated with a Ni—P-plated aluminum alloy substrate having a thickness of 1.27 mm, an outer diameter of 95 mm and an inner diameter of 25 mm as a substrate to be polished, wherein the substrate was previously roughly polished with a polishing composition containing an alumina abrasive to adjust its Ra to 1 nm.

Examples 1 to 10 and Comparative Examples 1 to 8

To water were added given amounts of a surfactant, sulfuric acid (98% by weight product, commercially available from Wako Pure Chemical Industries, Ltd.), and optionally aqueous hydrogen peroxide (35% by weight product, commercially available from ASAHI DENKA KOGYO K.K.) as shown in Table 1, while mixing, and a colloidal silica slurry (active ingredient: 20 to 40% by weight, medium: water) was finally added thereto while stirring, to give a polishing composition.

Figure 1:
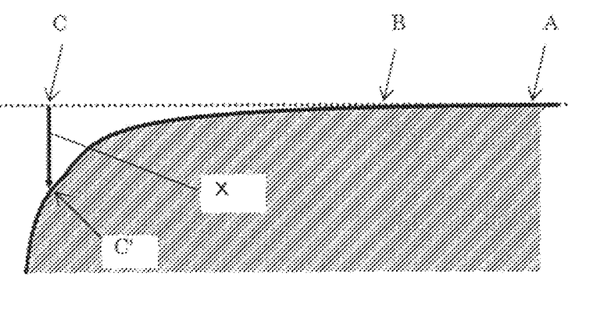

1. Polishing Conditions
   Polishing processing machine: double-sided 9B polishing machine, commercially available from SPEEDFAM CO., LTD.
   Polishing pad: a finish polishing pad, commercially available from FUJIBO (thickness: 0.9 mm, average pore size: 30 μm)
   Rotational speed of a platen: 45 r/min
   Flow rate for a polishing composition: 0.04 to 0.23 mL/min/cm$^2$
   Polishing time period: 5 minutes
   Polishing pressure (platen pressure): 2.9 to 10 kPa
   Number of substrates introduced: 10
2. Determination Conditions for Roll-Off
   Measurement Equipment: commercially available from Zygo under the trade name of New View 5032
   Lens: 2.5 times
   Zoom: 0.5 times
   Analyzing Software: Zygo Metro Pro The edge portion of the circumference 43.0 to 47.0 mm away from the center of the disk was considered as the determination region. Points A, B and C are defined as those points on the same straight line, 43.0 mm away, 44.0 mm away and 46.6 mm away from the center of the disk, respectively, to the peripheral direction as shown in FIG. 1. The position in the thickness direction of the disk of a point C' on a disk surface on the extension of a line connecting points A and B was determined for the substrate before and after polishing, and each was defined as roll-off before polishing (nm) and roll-off after polishing (nm). In the calculation of this position, analyzing software was used. In accordance with the following formula, the difference in roll-off before and after the polishing test was divided by the polished amount to calculate roll-off per unit polished weight (mg), which was defined as a roll-off value (nm/mg). In each polishing test, the determinations were made on both sides, 4 points per side, of two substrates, and an average of a total of 16 points is shown in Table 1.

Roll-Off Value (nm/mg)=[Roll-Off Before Polishing (nm)−Roll-Off After Polishing (nm)]/Polished Weight (mg)

3. Determination Conditions for pH
   The pH of the polishing composition was determined at 25° C. by using a pH meter (a glass-type hydrogen ion concentration indicator "HM-30G," commercially available from To a Denpa Kogyo K.K.).
4. Determination Method of Polishing Rate
   Change in weight of each substrate before and after polishing was determined for 10 substrates using a device commercially available from Sartorius under the trade name of BP-210S. A value obtained by dividing an average thereof by polishing time was defined as a weight-changing rate. The polishing rate (μm/minute) was calculated in accordance with the following formula, using a density of Ni—P of 8.4 g/cm$^3$ and an area of a single side of a substrate of 65.87 cm$^2$.

Weight-Changing Rate (g/minute)=[Weight (g) of Substrate Before Polishing−Weight (g) of Substrate After Polishing]/[Polishing Time (minute)]

Polishing Rate (μm/minute)=[Weight-Changing Rate (g/minute)/Area of Single Side of Substrate (Mm$^2$)/Ni—P Plated Density (g/cm$^3$)]×10$^6$

TABLE 1

| | Surfactant: R—(O)n—X—SO$_3$H or Salt Thereof | | | | | Silica | Acid (% by wt.) | | Hydrogen | |
|---|---|---|---|---|---|---|---|---|---|---|
| | R | n | X | Counter-ion | Amount (% by wt.) | (% by wt.) | Sulfuric Acid | Benzoic Acid | Peroxide (% by wt.) | pH |
| Ex. 1 | CH$_3$—(CH$_2$)$_{10}$—CH$_2$— | 0 | Phenylene | Na | 0.1 | 7 | 0.4 | — | 0 | 1.9 |
| Ex. 2 | CH$_3$—(CH$_2$)$_{10}$—CH$_2$— | 0 | Phenylene | Na | 0.01 | 7 | 0.4 | — | 0.6 | 1.7 |
| Ex. 3 | CH$_3$—(CH$_2$)$_{10}$—CH$_2$— | 0 | Phenylene | Na | 0.05 | 7 | 0.4 | — | 0.6 | 1.7 |
| Ex. 4 | CH$_3$—(CH$_2$)$_{10}$—CH$_2$— | 0 | Phenylene | Na | 0.1 | 7 | 0.4 | — | 0.6 | 1.7 |
| Ex. 5 | CH$_3$—(CH$_2$)$_{10}$—CH$_2$— | 0 | Naphthylene | Na | 0.1 | 7 | 0.4 | — | 0.6 | 1.7 |
| Ex. 6 | Cf6[2] | 1 | Phenylene | Na | 0.05 | 7 | 0.4 | — | 0.6 | 1.7 |
| Ex. 7 | Cf6[2] | 1 | Phenylene | Na | 0.1 | 7 | 0.4 | — | 0.6 | 1.7 |
| Ex. 8 | CH$_3$—(CH$_2$)$_{10}$—CH$_2$— | 0 | Phenylene | Na | 0.1 | 7 | 0.4 | — | 0.6 | 1.7 |
| Ex. 9 | CH$_3$—(CH$_2$)$_{10}$—CH$_2$— | 0 | Phenylene | Na | 0.1 | 7 | 0.4 | — | 0.6 | 1.7 |
| Ex. 10 | CH$_3$—(CH$_2$)$_{10}$—CH$_2$— | 0 | Phenylene | Na | 0.1 | 7 | 0.4 | — | 0.6 | 1.7 |
| Comp. Ex. 1 | — | — | — | — | — | 7 | 0.4 | — | 0.6 | 1.6 |
| Comp. Ex. 2 | CH$_3$— | 0 | Phenylene | Na | 0.1 | 7 | 0.4 | — | 0.6 | 1.6 |
| Comp. Ex. 3 | CH$_3$CH$_2$— | 0 | Phenylene | Na | 0.1 | 7 | 0.4 | — | 0.6 | 1.7 |
| Comp. Ex. 4 | CH$_3$—(CH$_2$)$_6$—CH$_2$— | 0 | | Na | 0.1 | 7 | 0.4 | — | 0.6 | 1.7 |
| Comp. Ex. 5 | CH$_3$—(CH$_2$)$_{10}$—CH$_2$— | 0 | Phenylene | Na | 0.1 | 7 | — | 0.4 | 0.6 | 5.7 |
| Comp. Ex. 6 | CH$_3$—(CH$_2$)$_{10}$—CH$_2$— | 0 | Phenylene | Na | 0.1 | 7 | 0.1 | — | 0.6 | 7.5 |
| Comp. Ex. 7 | CH$_3$—(CH$_2$)$_{10}$—CH$_2$— | 0 | Phenylene | Na | — | 7 | 0.4 | — | 0.6 | 1.7 |
| Comp. Ex. 8 | CH$_3$—(CH$_2$)$_{10}$—CH$_2$— | 0 | Phenylene | Na | 0.1 | 7 | 0.4 | — | 0.6 | 1.7 |

TABLE 1-continued

|  | Polishing Conditions | | Evaluation Results | |
|---|---|---|---|---|
|  | Polishing Pressure (kPa) | Flow Rate (mL/min./cm²) | Roll-off (nm/mg) | Polishing Rate (μm/min) |
| Ex. 1 | 10 | 0.1 | 1.00 | 0.04 |
| Ex. 2 | 10 | 0.1 | 1.52 | 0.12 |
| Ex. 3 | 10 | 0.1 | 1.25 | 0.11 |
| Ex. 4 | 10 | 0.1 | 1.25 | 0.11 |
| Ex. 5 | 10 | 0.1 | 1.48 | 0.11 |
| Ex. 6 | 10 | 0.1 | 1.24 | 0.11 |
| Ex. 7 | 10 | 0.1 | 1.26 | 0.11 |
| Ex. 8 | 6 | 0.1 | 1.60 | 0.06 |
| Ex. 9 | 10 | 0.15 | 1.18 | 0.11 |
| Ex. 10 | 10 | 0.23 | 1.16 | 0.12 |
| Comp. Ex. 1 | 10 | 0.1 | 1.90 | 0.15 |
| Comp. Ex. 2 | 10 | 0.1 | 1.90 | 0.15 |
| Comp. Ex. 3 | 10 | 0.1 | 1.88 | 0.15 |
| Comp. Ex. 4 | 10 | 0.1 | 2.26 | 0.15 |
| Comp. Ex. 5 | 10 | 0.1 | 2.25 | 0.05 |
| Comp. Ex. 6 | 10 | 0.1 | 2.60 | 0.03 |
| Comp. Ex. 7 | 2.9 | 0.1 | 2.56 | 0.04 |
| Comp. Ex. 8 | 10 | 0.04 | 1.85 | 0.10 |

[1] Balance being water.

[2] Cf6 =

It can be seen from the results shown in Table 1 that the substrates obtained by using the polishing compositions of Examples 1 to 7 have suppressed roll-off as compared to those of Comparative Examples 1 to 6. In addition, it can be seen that the substrates obtained by the polishing process and the method for manufacturing a substrate of Examples 4 and 8 to 10 have reduced roll-off as compared to those of Comparative Examples 7 and 8.

Examples 11 to 26 and Comparative Examples 9 to 11

To water were added given amounts of a surfactant, sulfuric acid (98% by weight product, commercially available from Wako Pure Chemical Industries, Ltd.) and/or aqueous HEDP solution (60% by weight product, commercially available from Solutia Japan), optionally thereafter aqueous hydrogen peroxide (35% by weight product, commercially available from ASAHI DENKA KOGYO K.K.) was added thereto while mixing, each of which amount is shown in Table 2, and finally a colloidal silica slurry (average primary particle size: 22 nm, active ingredient 20 to 40% by weight, medium: water) was added thereto, to give a polishing composition.

1. Polishing Conditions

Polishing processing machine: double-sided 9B polishing machine, commercially available from SPEEDFAM CO., LTD.

Polishing pad: a finish polishing pad, commercially available from FUJIBO (thickness: 0.9 mm, average pore size: 30 μm)

Rotational speed of a platen: 45 r/min

Flow rate for a polishing composition: 0.1 to 0.2 mL/min/cm²

Polishing time period: 5 minutes

Polishing pressure (platen pressure): 6 to 15 kPa

Number of substrates introduced: 10

The determination conditions for roll-off, the determination conditions for pH, and the determination method of polishing rate were the same as those described in Examples 1 to 10 mentioned above.

TABLE 2

| | Components of Polishing Composition[1] | | | | | | Acid (% by weight) | | Hydrogen |
|---|---|---|---|---|---|---|---|---|---|
| | Surfactant: R'—O—(AO)n—SO₃M | | | | | Silica (% by wt.) | Sulfuric Acid | HEDP[2] | Peroxide (% by wt.) |
| | Content (% by wt.) | R' | AO | n | M | | | | |
| Ex. 11 | 0.1 | $CH_3—(CH_2)_{11}$ | Oxyethylene | 2.5 | Na | 7 | 0.4 | — | 0 |
| Ex. 12 | 0.01 | $CH_3—(CH_2)_{11}$ | Oxyethylene | 2.5 | Na | 7 | 0.4 | — | 0.6 |
| Ex. 13 | 0.1 | $CH_3—(CH_2)_{11}$ | Oxyethylene | 2.5 | Na | 7 | 0.4 | — | 0.6 |
| Ex. 14 | 2.0 | $CH_3—(CH_2)_{11}$ | Oxyethylene | 2.5 | Na | 7 | 0.4 | — | 0.6 |
| Ex. 15 | 0.1 | $CH_3—(CH_2)_{11}$ | Oxyethylene | 2.5 | TEA[3] | 7 | 0.4 | — | 0.6 |
| Ex. 16 | 0.1 | $CH_3—(CH_2)_{11}$ | Oxyethylene | 1.0 | Na | 7 | 0.4 | — | 0.6 |
| Ex. 17 | 1.1 | $CH_3—(CH_2)_{11}$ | Oxyethylene | 4.0 | Na | 7 | 0.4 | — | 0.6 |
| Ex. 18 | 0.1 | $CH_3—(CH_2)_{13}$ | Oxyethylene | 2.0 | Na | 7 | 0.4 | — | 0.6 |
| Ex. 19 | 0.1 | Paraffin (C12-C16) | Oxyethylene | 3.0 | Na | 7 | 0.4 | — | 0.6 |

TABLE 2-continued

| | | | | | | | | | |
|---|---|---|---|---|---|---|---|---|---|
| Ex. 20 | 0.1 | CH$_3$—(CH$_2$)$_{11}$ | Oxyethylene | 2.5 | Na | 7 | 0.4 | 0.1 | 0.6 |
| Ex. 21 | 0.1 | Paraffin (C12-C16) | Oxyethylene | 3.0 | Na | 7 | 0.4 | 0.1 | 0.6 |
| Ex. 22 | 0.1 | CH$_3$—(CH$_2$)$_{11}$ | Oxyethylene | 2.5 | Na | 7 | — | 2.0 | 0.6 |
| Ex. 23 | 0.1 | Paraffin (C12-C16) | Oxyethylene | 3.0 | Na | 7 | — | 2.0 | 0.6 |
| Ex. 24 | 0.1 | CH$_3$—(CH$_2$)$_{11}$ | Oxyethylene | 2.5 | Na | 7 | 0.4 | — | 0.6 |
| Ex. 25 | 0.1 | CH$_3$—(CH$_2$)$_{11}$ | Oxyethylene | 2.5 | Na | 7 | 0.4 | — | 0.6 |
| Ex. 26 | 0.1 | CH$_3$—(CH$_2$)$_{11}$ | Oxyethylene | 2.5 | Na | 7 | 0.4 | — | 0.6 |
| Comp. Ex. 9 | — | — | — | 0 | — | 7 | 0.4 | — | 0.6 |
| Comp. Ex. 10 | 0.1 | CH$_3$—(CH$_2$)$_{11}$ | — | 0 | Na | 7 | 0.1 | — | 0.6 |
| Comp. Ex. 11 | 1.1 | CH$_3$—(CH$_2$)$_{11}$ | Oxyethylene | 2.5 | Na | 7 | 0.1 | — | 0.6 |

| | pH | Polishing Pressure (kPa) | Flow Rate (mL/min/cm$^2$) | Roll-Off (nm/mg) | Polishing Rate (μm/min) |
|---|---|---|---|---|---|
| Ex. 11 | 1.8 | 15 | 0.2 | 1.05 | 0.04 |
| Ex. 12 | 1.7 | 15 | 0.2 | 1.47 | 0.12 |
| Ex. 13 | 1.7 | 15 | 0.2 | 1.05 | 0.11 |
| Ex. 14 | 1.7 | 15 | 0.2 | 1.01 | 0.09 |
| Ex. 15 | 1.7 | 15 | 0.2 | 1.62 | 0.11 |
| Ex. 16 | 1.7 | 15 | 0.2 | 1.52 | 0.11 |
| Ex. 17 | 1.7 | 15 | 0.2 | 1.39 | 0.12 |
| Ex. 18 | 1.7 | 15 | 0.2 | 1.18 | 0.11 |
| Ex. 19 | 1.7 | 15 | 0.2 | 1.10 | 0.12 |
| Ex. 20 | 1.6 | 15 | 0.2 | 1.07 | 0.11 |
| Ex. 21 | 1.6 | 15 | 0.2 | 1.08 | 0.12 |
| Ex. 22 | 1.7 | 15 | 0.2 | 1.04 | 0.12 |
| Ex. 23 | 1.7 | 15 | 0.2 | 1.06 | 0.11 |
| Ex. 24 | 1.7 | 6 | 0.2 | 1.60 | 0.07 |
| Ex. 25 | 1.7 | 10 | 0.2 | 1.12 | 0.12 |
| Ex. 26 | 1.7 | 15 | 0.1 | 1.63 | 0.11 |
| Comp. Ex. 9 | 1.6 | 15 | 0.2 | 1.90 | 0.15 |
| Comp. Ex. 10 | 1.7 | 15 | 0.2 | 2.23 | 0.14 |
| Comp. Ex. 11 | 3.5 | 15 | 0.2 | 2.21 | 0.06 |

[1] Balance is water, % by weight shows the net content in the polishing composition.
[2] HEDP: 1-Hydroxyethylidene-1,1-diphosphonic acid
[3] TEA: Triethanolammonium It can be seen from the results shown in Table 2 that the substrates obtained by using the polishing compositions of Examples 11 to 26 have suppressed roll-off, as compared to those of Comparative Examples 9 to 11.

Experimental Examples 1 to 21

Polishing was carried out using the above substrate to be polished and the following polishing composition, and polishing rate and waviness were evaluated.

[Preparation of Polishing Composition]

To ion-exchanged water were added given amounts of sulfuric acid (commercially available from Wako Pure Chemical Industries, Ltd., special grade), aqueous hydrogen peroxide (35% by weight product, commercially available from ASAHI DENKA KOGYO K.K.), and a surfactant (commercially available from Kao Corporation or commercially available from Tokyo Kasei Reagent) as shown in Table 3, while thoroughly mixing. Thereafter, an aqueous slurry of a colloidal silica (silica having an average primary particle size (D50): 12 nm, D90: 26 nm, silica concentration: 25% by weight, pH=10) was added thereto, and the mixture was stirred again, to give a polishing composition. For each of the resulting polishing composition, the pH was determined.

[Polishing Conditions]

Polishing processing machine: double-sided 9B polishing machine, commercially available from SPEEDFAM CO., LTD.

Polishing pad: a suede-type polishing pad, commercially available from FUJIBO (thickness: 0.9 mm, average pore size: 30 μm)

Polishing time period: 5 minutes

Number of substrates introduced: 10

Incidentally, as to polishing pressure, flow rate for a polishing composition, and relative rate of a substrate to be polished to a polishing pad, a reference is made to those in Table 3.

In addition, the determination conditions of pH and the determination method of polishing rate were the same as those described in Examples 1 to 10 mentioned above, except that in the determination method of polishing rate, the density of Ni—P was changed to 8.0 g/cm$^2$ and an area of a single side of a substrate was changed to 66.0 cm$^3$.

[Determination Method of Waviness]

Two substrates were arbitrarily selected from 10 polished substrates, and waviness of both sides of each substrate was determined under the following conditions. The results are shown in Table 3.

[Determination Conditions of Waviness]

Measurement Equipment: commercially available from ThôT Technologies under the trade name of ThôT Model 4224

Measurement principle: laser Doppler vibrator (iodine-stabilized He—Ne laser: 633 nm)

Measurement Wavelength: 0.4 to 2 mm
Measurement Positions: Over Entire Side, a radius of from 20 to 46 mm away from the center of the substrate
Rotational speed of platen: 6000 r/min
Gain: 16
Filter: 10 kHz
Laser Range: 5 mm/s/V
Track Pitch: 0.01 mm

TABLE 3

| | Polishing Composition | | | | | | | |
|---|---|---|---|---|---|---|---|---|
| | Surfactant: $R^1$—(O)$m^1$—$SO_3M^1$ | | | | Silica[1] | Acid or Salt Thereof Sulfuric Acid[1] | Hydrogen Peroxide[1] | pH |
| | Amount[1] | $R^1$ | $m^1$ | $M^1$ | | | | |
| Exp. Ex. 1 | 0.1 | C12 | 1 | Na | 5 | 0.5 | 1 | 1.7 |
| Exp. Ex. 2 | 0.1 | C12 | 1 | Na | 5 | 0.5 | 1 | 2.0[3] |
| Exp. Ex. 3 | 0.1 | C12 | 1 | Na | 5 | 0.5 | 1 | 2.5[3] |
| Exp. Ex. 4 | 0.1 | C12 | 1 | Na | 5 | 0.5 | 1 | 1.7 |
| Exp. Ex. 5 | 0.1 | C12 | 1 | Na | 5 | 0.5 | 1 | 1.7 |
| Exp. Ex. 6 | 0.1 | C13 | 1 | Na | 5 | 0.5 | 1 | 1.7 |
| Exp. Ex. 7 | 0.1 | C12 | 1 | Na | 5 | 0.5 | 1 | 1.7 |
| Exp. Ex. 8 | 0.1 | C12 | 1 | Na | 5 | 0.5 | 1 | 1.7 |
| Exp. Ex. 9 | 0.2 | C12 | 1 | Na | 5 | 0.5 | 1 | 1.7 |
| Exp. Ex. 10 | 2 | C12 | 1 | Na | 5 | 0.5 | 1 | 1.8 |
| Exp. Ex. 11 | 0.05 | C12 | 1 | Na | 5 | 0.5 | 1 | 1.7 |
| Exp. Ex. 12 | 0.01 | C12 | 1 | Na | 5 | 0.5 | 1 | 1.7 |
| Exp. Ex. 13 | 0.1 | C12 | 1 | TEA[2] | 5 | 0.5 | 1 | 1.7 |
| Exp. Ex. 14 | 0.1 | C12 | 1 | NH4 | 5 | 0.5 | 1 | 1.7 |
| Exp. Ex. 15 | 0.1 | C12-C16 | 1 | Na | 5 | 0.5 | 1 | 1.7 |
| Exp. Ex. 16 | 0.1 | C8 | 0 | Na | 5 | 0.5 | 1 | 1.7 |
| Exp. Ex. 17 | 0.1 | C14-C17 | 0 | Na | 5 | 0.5 | 1 | 1.7 |

| | $R^2OOC$—$CH_2CH(SO_3M^2)$—$COOR^3$ | | | Silica[1] | Acid or Salt Thereof Sulfuric Acid[1] | Hydrogen Peroxide[1] | pH |
|---|---|---|---|---|---|---|---|
| | Amount[1] | $R^2$ | $R^3$ | $M^2$ | | | |
| Exp. Ex. 18 | 0.1 | C8 | C8 | Na | 5 | 0.5 | 1 | 1.7 |

| | $R^4$—$C_6H_3(SO_3M^3)$—O—$C_6H_4(SO_3M^4)$ | | | Silica[1] | Acid or Salt Thereof Sulfuric Acid[1] | Hydrogen Peroxide[1] | pH |
|---|---|---|---|---|---|---|---|
| | Amount[1] | $R^4$ | $M^3$ | $M^4$ | | | |
| Exp. Ex. 19 | 0.1 | C9-C14 | Na | Na | 5 | 0.5 | 1 | 1.7 |

| | $R^1$—(O)$m^1$—$SO_3M^1$ | | | | Silica[1] | Acid or Salt Thereof Sulfuric Acid[1] | Hydrogen Peroxide[1] | pH |
|---|---|---|---|---|---|---|---|---|
| | Amount[1] | $R^1$ | $m^1$ | $M^1$ | | | | |
| Exp. Ex. 20 | — | — | — | — | 5 | 0.5 | 1 | 1.6 |
| Exp. Ex. 21 | 0.1 | C12 | 1 | Na | 5 | 0.5 | 1 | 3.0[3] |

| | Polishing Conditions | | | Evaluation | | |
|---|---|---|---|---|---|---|
| | Polishing Pressure (kPa) | Flow Rate (mL/min/cm²) | Relative Rate (m/s) | Waviness R20 (nm)[4] | Waviness R46 (nm)[4] | Polishing Rate (μm/min) |
| Exp. Ex. 1 | 10 | 0.15 | 0.5 | 0.33 | 0.82 | 0.13 |
| Exp. Ex. 2 | 10 | 0.15 | 0.5 | 0.50 | 0.84 | 0.09 |
| Exp. Ex. 3 | 10 | 0.15 | 0.5 | 0.57 | 0.88 | 0.06 |
| Exp. Ex. 4 | 5 | 0.15 | 0.5 | 0.54 | 0.84 | 0.07 |
| Exp. Ex. 5 | 10 | 0.08 | 0.5 | 0.34 | 0.71 | 0.13 |
| Exp. Ex. 6 | 10 | 0.15 | 1.2 | 0.34 | 0.99 | 0.21 |
| Exp. Ex. 7 | 15 | 0.30 | 0.5 | 0.34 | 0.71 | 0.17 |
| Exp. Ex. 8 | 15 | 0.30 | 0.25 | 0.34 | 0.76 | 0.15 |
| Exp. Ex. 9 | 10 | 0.15 | 0.5 | 0.42 | 0.79 | 0.13 |
| Exp. Ex. 10 | 10 | 0.15 | 0.5 | 0.59 | 0.92 | 0.05 |
| Exp. Ex. 11 | 10 | 0.15 | 0.5 | 0.40 | 0.78 | 0.13 |
| Exp. Ex. 12 | 10 | 0.15 | 0.5 | 0.36 | 0.86 | 0.12 |
| Exp. Ex. 13 | 10 | 0.15 | 0.5 | 0.33 | 0.73 | 0.12 |
| Exp. Ex. 14 | 10 | 0.15 | 0.5 | 0.34 | 0.85 | 0.14 |
| Exp. Ex. 15 | 10 | 0.15 | 0.5 | 0.48 | 0.83 | 0.09 |
| Exp. Ex. 16 | 10 | 0.15 | 0.5 | 0.33 | 0.96 | 0.17 |
| Exp. Ex. 17 | 10 | 0.15 | 0.5 | 0.55 | 0.87 | 0.06 |

| | Polishing Pressure (kPa) | Flow Rate (mL/min/cm²) | Relative Rate (m/s) | Waviness R20 (nm)[4] | Waviness R46 (nm)[4] | Polishing Rate (μm/min) |
|---|---|---|---|---|---|---|
| Exp. Ex. 18 | 10 | 0.15 | 0.5 | 0.31 | 0.68 | 0.12 |
| Exp. Ex. 19 | 10 | 0.15 | 0.5 | 0.35 | 0.91 | 0.10 |

TABLE 3-continued

| | | | | | | |
|---|---|---|---|---|---|---|
| Exp. Ex. 20 | 10 | 0.15 | 0.5 | 0.48 | 1.18 | 0.16 |
| Exp. Ex. 21 | 10 | 0.15 | 0.5 | 0.93 | 1.65 | 0.02 |

[1] % by weight
[2] Triethanolammonium
[3] pH adjustment with NaOH
[4] Waviness R20 and Waviness R46 are respectively waviness at positions of a 20 mm radius and a 46 mm radius away from the center of each substrate. Waviness is expressed by an average of a total of four sides (two pieces of substrates, two sides (both sides)).

It can be seen from Table 3 that the substrates obtained by using the polishing compositions of the present invention have remarkably reduced waviness in the peripheral portion, and reduced waviness over the entire surface of the substrates. Further, it can be seen that further reduction in waviness can be realized by employing the polishing process of the present invention.

The polishing composition, and the polishing process of a substrate and the method for manufacturing a substrate of the present invention can be suitably used for, for example, substrates for disk recording media such as magnetic disks, optical disks and opto-magnetic disks.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a hard disk substrate, comprising the steps of:
   feeding a polishing composition at a flow rate of 0.05 mL/minute or more per 1 cm² of a substrate to be polished; and
   polishing the substrate at a polishing pressure of from 5 to 50 kPa;
   wherein said polishing composition comprises a silica, an acid, a surfactant, an oxidizing agent, and water, wherein:
   (a') the acid has solubility in water at 25° C. of 1 g or more per 100 g of an aqueous saturated solution;
   (b') the surfactant is a sodium salt of a sulfonic acid represented by the following formula (2):

$$R'\text{—}O\text{-}(AO)_n\text{—}SO_3H \quad (2)$$

wherein R' is a hydrocarbon group having 12 carbon atoms; AO is an oxyalkylene group having 2 carbon atoms; and n, which is an average number of moles of alkylene oxide added, is from 2.0 to 3.0; and
   (c') the polishing composition has a pH of from 0 to 3;
   wherein the surfactant is contained in an amount of from 0.01 to 2% by weight of the polishing composition;
   wherein the hard disk substrate has a roll-off of 1.05 nm/mg or less; and
   wherein primary particles of said silica have an average particle size of 5 to 35 nm.

2. The method for manufacturing a hard disk substrate according to claim 1, wherein said polishing composition has a pH of from 0.5 to 2.5.

* * * * *